United States Patent

Arbab et al.

[15] 3,680,061

[45] July 25, 1972

[54] INTEGRATED CIRCUIT BIPOLAR RANDOM ACCESS MEMORY SYSTEM WITH LOW STAND-BY POWER CONSUMPTION

[72] Inventors: Majid Arbab, Redondo Beach; William Y. Wong, Torrance; Kuenseng Yu, Westminster, all of Calif.

[73] Assignee: The National Cash Register Company, Dayton, Ohio

[22] Filed: April 30, 1970

[21] Appl. No.: 33,253

[52] U.S. Cl. ....................................340/173 R, 340/173 FF
[51] Int. Cl. ....................................G11c 7/00
[58] Field of Search ....................................340/173 FF, 173 R

[56] References Cited

UNITED STATES PATENTS

| | | | |
|---|---|---|---|
| 3,505,573 | 4/1970 | Wiedmann | 340/173 FF |
| 3,528,065 | 9/1970 | Christensen | 340/173 R |
| 3,540,010 | 11/1970 | Heightley | 340/173 F |
| 3,389,383 | 6/1968 | Burke | 340/173 FF |
| 3,548,386 | 12/1970 | Bidwell | 340/173 FF |
| 3,440,444 | 4/1969 | Rapp | 340/173 FF |

*Primary Examiner*—Bernard Konick
*Assistant Examiner*—Stuart Hecker
*Attorney*—Louis A. Kline and Joseph R. Dwyer

[57] ABSTRACT

A semiconductor memory circuit for fabrication on a LSI chip. The circuit on the chip corresponding to a digit plane of a computer memory comprises a two-coordinate array of memory cells and all the service circuits associated with the operation of the memory array. During standby or idling operation of the memory circuit all of the service circuits are de-energized such that the only power dissipated is that resulting from the current flow required for retaining the binary digits stored in the memory cells. In order to operate the memory circuit, a chip enable pulse is applied to energize all the service circuits thus causing the memory circuit to momentarily operate at a higher power dissipation level during which either a read or write function is performed on a selected memory cell of the array.

3 Claims, 5 Drawing Figures

INVENTORS
MAJID ARBAB
WILLIAM Y. WONG
KUEN SENG YU

BY Louis A Kline
Joseph Dwyer
John J. Matlago
THEIR ATTORNEYS

PATENTED JUL 25 1972

3,680,061

INVENTORS
MAJID ARBAB
WILLIAM Y. WONG
KUEN SENG YU

BY Louis A Kline
Joseph R Dwyer
John T. Matlago
THEIR ATTORNEYS

INVENTORS
MAJID ARBAB
WILLIAM Y. WONG
KUEN SENG YU

BY Louis A. Klein
Joseph K. Dwyer
John T. Matlago
THEIR ATTORNEYS

INTEGRATED CIRCUIT BIPOLAR RANDOM ACCESS MEMORY SYSTEM WITH LOW STAND-BY POWER CONSUMPTION

This invention relates to computer memories and more particularly to a high-performance random-access integrated circuit semiconductor memory with low power dissipation.

With the advances of large scale integrated circuit technology, commonly abbreviated LSI, the semiconductor industry has obtained the capability of fabricating and interconnecting a large quantity of circuit components on a single semiconductor chip. In particular, the LSI fabrication technology has made it economically feasible to produce large quantities of interconnected semiconductor memory cells, i.e., binary storage devices, on a single chip, as required for forming memory arrays for digital computers. One of the determining factors which limits the number of memory cells that can be incorporated on a single LSI chip of an operating memory is the power dissipated in each chip. If the power dissipated is too high, the chip will be damaged by the high temperatures produced to the extent that the LSI circuits fabricated thereon will fail to operate reliably. Hence any system organization of the memory cells and associated circuits which results in a savings in the power dissipated during the operation of the integrated circuits on the LSI chip is highly desirable since it will contribute to increasing the number of memory cells that can be safely included on the memory chip.

In the present invention, the basic memory cell comprises a flipflop formed of a pair of transistors. Either one or the other transistor in each cell conducts depending upon whether the memory cell is storing a binary "" or "0" digit. The memory cells are organized in an array having $m$ columns and $n$ rows with a common sense preamplifier and write network provided for the memory cells in each of the columns of the array. Row decoders are provided for enabling the memory cells of a selected one of the rows of the array to be coupled to the common sense preamplifier and write network provided for each column, and column decoders are provided for enabling only a selected one of the common sense preamplifier and write networks to be operable to either sense the digit stored or write a digit into a selected cell of the array. The common sense preamplifier and write networks for each column serve the multiple functions of providing current paths for the current conducted through all the memory cells during the idling or standby operation of the memory array, of providing current paths to the sense preamplifiers for the currents of the selected cell of the row rendered operable by the row decoder, and of providing current paths for use in writing external data into the selected cell of the column it serves. The memory array on the individual chip is designed to operate at a relatively low power dissipation level to retain the stored data in the memory during idling or standby operation, and to be momentarily operated at a relatively high power dissipation level in response to a chip enable pulse to write data into or read data from a selected cell of the array. Accordingly, the basic cell of the memory array is designed so that the power dissipated in each cell during idling or standby operation of the memory is only sufficient to reliably keep each cell from inadvertently altering its contents. Then when the memory is to be operated, the circuits on the chip associated with the operation of the memory array, i.e., the service circuits on the chip such as the row decoders, the column decoders, the sense output summer circuit, the data input circuit, and the read-write control circuit respond to the chip enable pulse as required in order to enable them to momentarily function to read or write data into a selected cell of the memory.

Accordingly, one of the objects of the present invention is to provide a semiconductor random access memory circuit with a low power dissipation for fabrication on a LSI chip.

Another object of the present invention resides in providing for reducing the power dissipated by a semiconductor memory circuit fabricated on a chip by pulsing all the service circuits associated with the memory array such that they are only momentarily operable as needed during reading or writing into a selected cell.

Another object of this present invention resides in providing for operating all the memory cells on a chip at a relatively low power dissipation level during idling or standby operation and only momentarily operating the memory at a relatively high power dissipation level during the accessing of a selected memory cell for the performing of a reading or writing operation.

Other objects and features of the invention will become apparent to those skilled in the art from the following description of the preferred embodiment of the invention illustrated in the accompanying sheets of drawings, in which.

Figure 1:
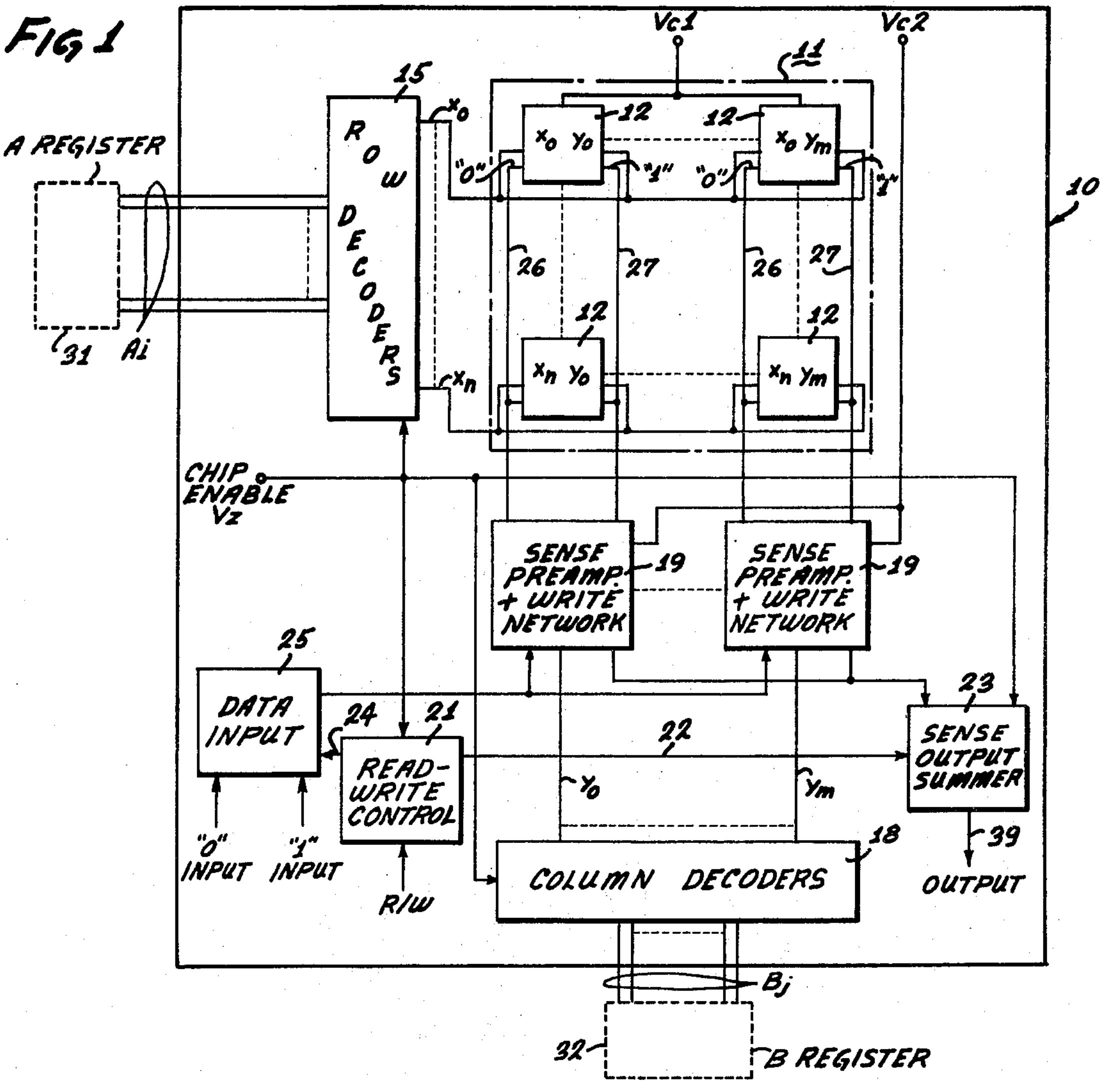
FIG. 1 is a block diagram illustrating the circuit provided for the semiconductor memory of the present invention.

Referring to FIG. 1, a schematic block diagram is shown of the preferred embodiment of the memory circuitry of the present invention which is fabricated by the use of LSI fabrication technology on a single silicon chip 10. It should be understood that the chip 10 fabricated with the circuitry of FIG. 1 is storing only one of the like binary digits of each of a plurality of multidigit words being stored in the memory and that a chip with similar circuitry to that shown in FIG. 1 is required for storing each of the other like binary digits of each of the plurality of multidigit words. Stated otherwise, the chip 10 corresponds to a digit plane of a computer memory and a full size memory would be comprised of a number of chips 10 corresponding to the number of digits in the words stored.

The circuitry on each chip 10 is comprised of a two-coordinate array 11 of memory cells 12 arranged in n rows and m columns. Associated with each column of memory cells in the array is a sense preamplifier and write network 19. In addition each chip 10 includes thereon all the service circuitry, i.e., all the circuitry needed to enable the digit plane to be operated. The service circuitry includes row decoders 15 and column decoders 18 which operate to render a selected one of the cells 12 of the array 11 operable, data input circuit 25 which provides for introducing external data into the selected cell, sense output summer circuit 23 which senses the data read out of a selected cell, and read-write control circuit 21 which controls whether a read or write cycle is to be performed on the selected cell of the array 11. Each of the row of memory cells 12 is operably coupled to a respective one of the row decoders 15 by way of common row select lines $x_o$ - - - $x_n$, and each column of memory cells is operably coupled to a respective one of the column decoders 18 by way of one of column select lines $y_o$ - - - $y_m$. As will be described more clearly in connection with FIG. 2, each of the memory cells 12 of the array 11 is a flipflop circuit comprised of a pair of bipolar transistors for storing a binary "1" or binary "0" digit. During idling operation of the memory array 11 each of the memory cells 12 in a column, such as column $y_o$ shown, conducts through either one or the other line of a pair of common lines 26 and 27 associated therewith, depending upon whether a binary "0" or a binary "1" digit is stored in each of the memory cells. Likewise, each of the memory cells in the other columns of the array, such as column $y_m$ shown, conducts through either one or the other line of a pair of common lines 26 and 27 associated therewith depending upon whether a binary "0" or a binary "1" digit is stored in each of the memory cells. Connected to the pair of common lines 26 and 27 associated with each column is the sense preamplifier and write network 19. During idling operation of the memory array, i.e. during the time that the memory array is storing data on a standby basis, current from source Vc1 conducts through each of the memory cells in each column to either common line 26 or 27, depending upon whether a binary "1" or "0" digit is stored therein, and into its associated sense preamplifier and write network 19 and then to ground. During the standby operation the service circuits on the chip 10, such as the row decoders 15, the column decoders 18, the input data circuit 25, the sense output summer circuit 23 and the read-write control 21 are not energized inasmuch as each of these is connected to be rendered operably only by chip enable pulse Vz.

The input waveforms applied to the service circuits, including the waveform of the chip enable pulse Vz, during the read and write operation of the memory, will be explained in connection with FIGS. 4 and 5. Thus when the memory array on the chip 10 is addressed to read out of or write into a selected cell 12 in the array 11, the outputs Ai of the A register 31 are fed to row decoders 15 and the outputs Bj of the B register 32 are simultaneously fed to the column decoders 18. As a result of the A register 31 receiving an address, high potential signals are provided on only the set of Ai lines connected to a desired one of the row decoders 15 so as to render it operable to select a desired one of the $X_o$ - - - $x_n$ row lines. All the other row decoders 15, i.e., the row decoders 15 connected to unselected ones of the $x_o$ - - - $x_n$ row lines have at least one low potential signal provided on the set of Ai lines connected thereto from the A register 31. As a result of the B register receiving an address, high potential signals are provided on the set of Bj lines connected to the desired one of the column decoders 18 so as to render it operable to select a desired one of the column $y_o$ - - - $y_m$ column lines. All other column decoders 18, i.e., the column decoders 18 connected to unselected ones of the $y_o$ - - - $y_m$ column lines have at least one low potential signal provided on the set of Bj lines connected thereto from the B register 32. It should be noted that although the outputs Ai and Bj of the A register 31 and B register 32, respectively, are applied to the row decoders 15 and the column decoders 18 shown in FIG. 1, neither of these decoders is operable to select a row line or a column line of the array until the chip enable pulse Vz is applied to the chip 10.

Figure 5:
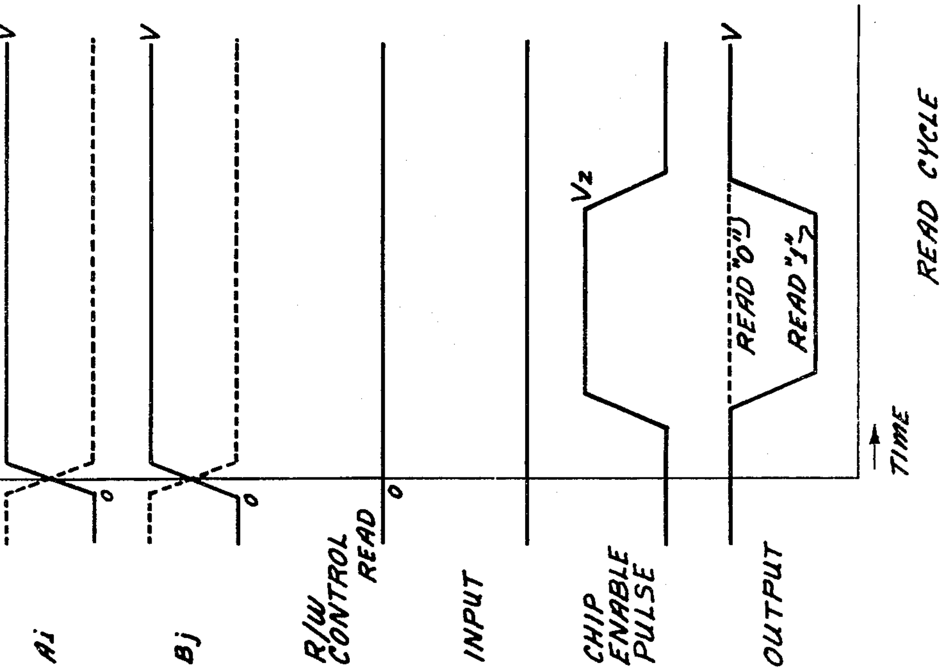
FIG. 5 is a diagram of the waveforms provided during the reading of data from a selected memory cell of the array.
Figure 4:
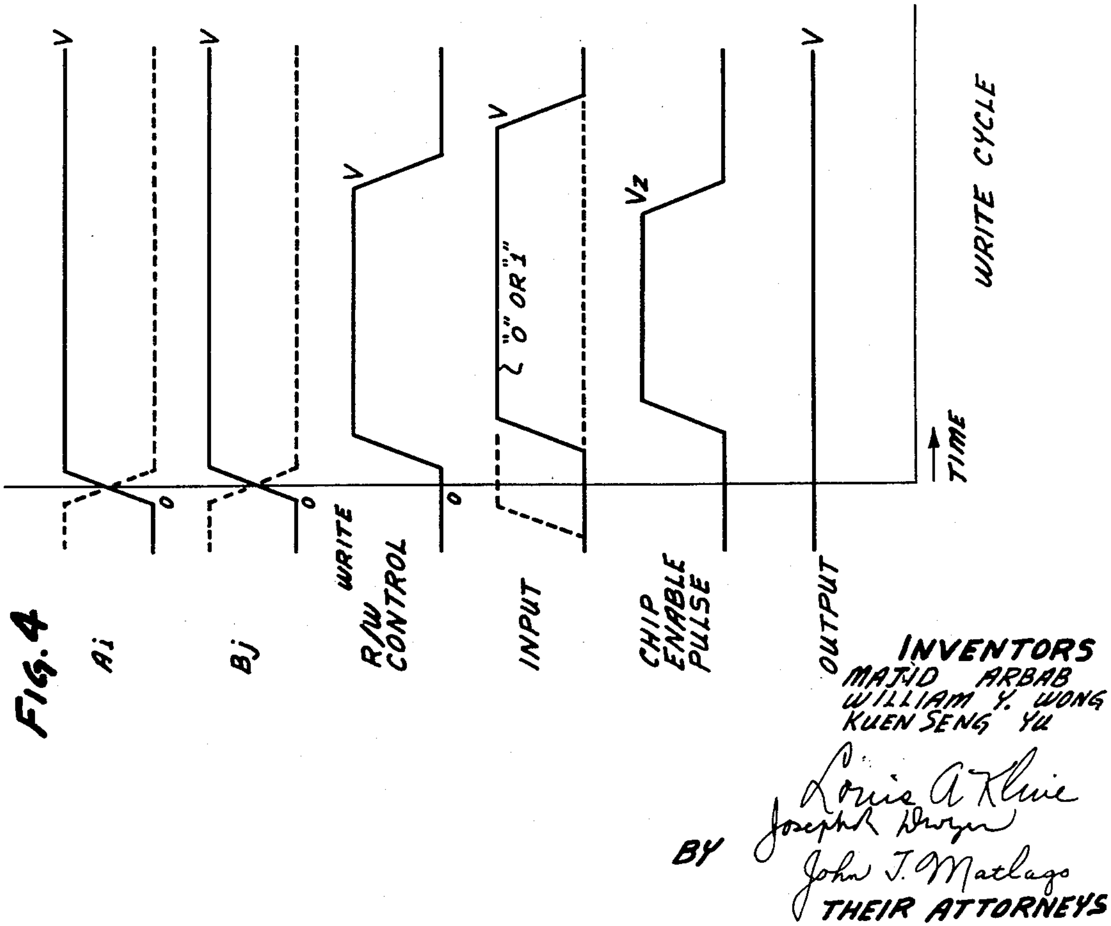
FIG. 4 is a diagram of the waveforms provided during the writing of data into a selected memory cell of the array.

As noted in FIGS. 4 and 5, before the chip enable pulse Vz is applied to the chip, the read-write control circuit 21 must receive the R/W control signal to determine whether the selected cell 12 in the memory array 11 is to be read out of or written into. If the R/W control signal applied at this time to the read-write control circuit 21 is of a high potential, a write cycle (FIG. 4) is to be performed on the memory array 11, and if the R/W control signal is of a low potential, a read cycle (FIG. 5) is to be performed on the memory array 11. As noted in FIG. 1, the read-write control circuit 21 has one of its outputs 22 connected to the sense output summer circuit 23 and the other of its outputs 24 connected to the data input circuit 25. It should be noted here also that although the R/W control signal is applied to the read-write control circuit 21, neither the input data circuit 25 nor the sense output summer circuit 23 is operable until the chip enable pulse Vz is applied to the chip.

It should now be clear from the description of the block diagram of the memory array circuit shown in FIG. 1, that the circuit arrangement on the chip 10 is such that during idling operation of the memory each of the memory cells 12 of the array 11 is operating to draw current and thus dissipating power at a low level. However, all the service circuits provided on the chip, such as the row decoders 15, the column decoders 18, the sense output summer circuit 23, and the read-write control circuit 21, as well as the data input circuit 25 which is controlled by circuit 21, are all unable to operate to draw current and thus do not dissipate any power until it is desired to read from or write into a selected cell 12 of the memory array 11. It is only after row decoders 15 and column decoders 18 have been set to address the desired memory cell and the read-write control 21 has received an R/W control signal to determine whether it is desired to read or write into the addressed cell, that the chip enable pulse Vz is then applied to the chip to enable the service circuits to perform the desired operation on the memory. Generally, as a result of the row decoders 15 and column decoders 18 having been set to an address, the row decoders 15 operate in response to the chip enable pulse Vz to divert current of all the memory cells 12 of the array 11 away from the pair of common lines 26 and 27 associated with each column of memory cells, except the current that is flowing in these respective pair of lines from the memory cells in the selected row. In other words, as a result of such a selection, the pair of common lines 26 and 27 associated with each column becomes the sense and write lines for the cell in the column of the selected row only. The column decoders 18 operate to render operable only the sense preamplifier and write network 19 of the selected column. Now then, depending upon whether a read or write R/W control signal is received, in response to chip enable pulse Vz, as will be more fully explained in connection with FIG. 2, either the sense preamplifier portion of network 19 is rendered operable to provide a signal to the sense output summer circuit 23 corresponding to the digit stored in the selected cell, or the write portion of network 19 is rendered operable to store a binary "1" or a "0" digit supplied on the data input circuit 25 in the selected cell.

A more detailed description of the circuitry and operation of the memory array for performing the operations of reading and writing from an addressed memory cell will next be presented.

Figure 3:
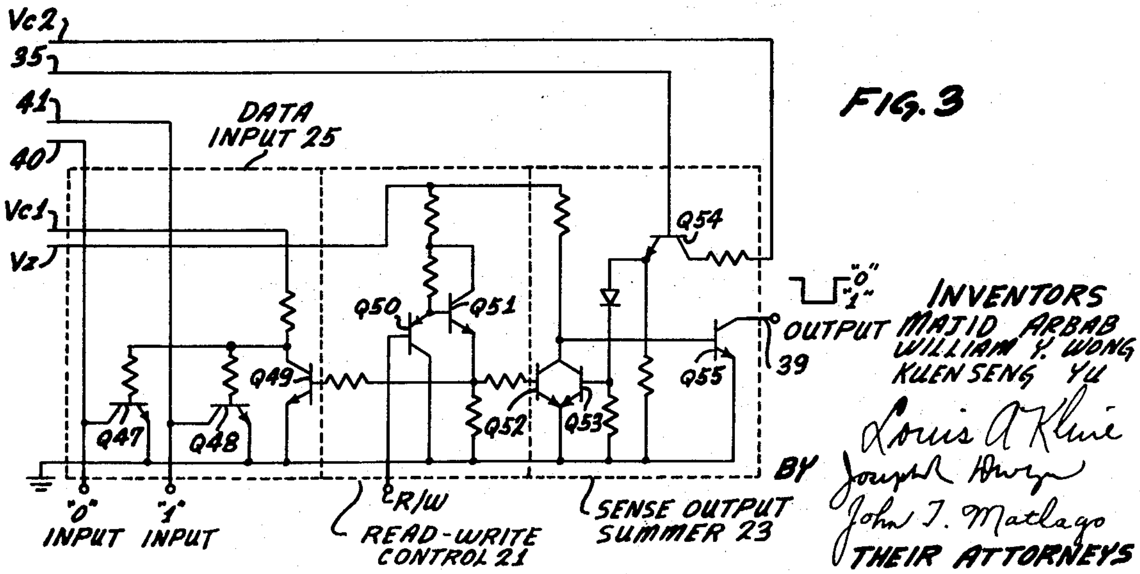
FIG. 3 is a schematic diagram of the data input, read-write control, and sense output summer circuits for the memory array shown in FIG. 2.
Figure 2:
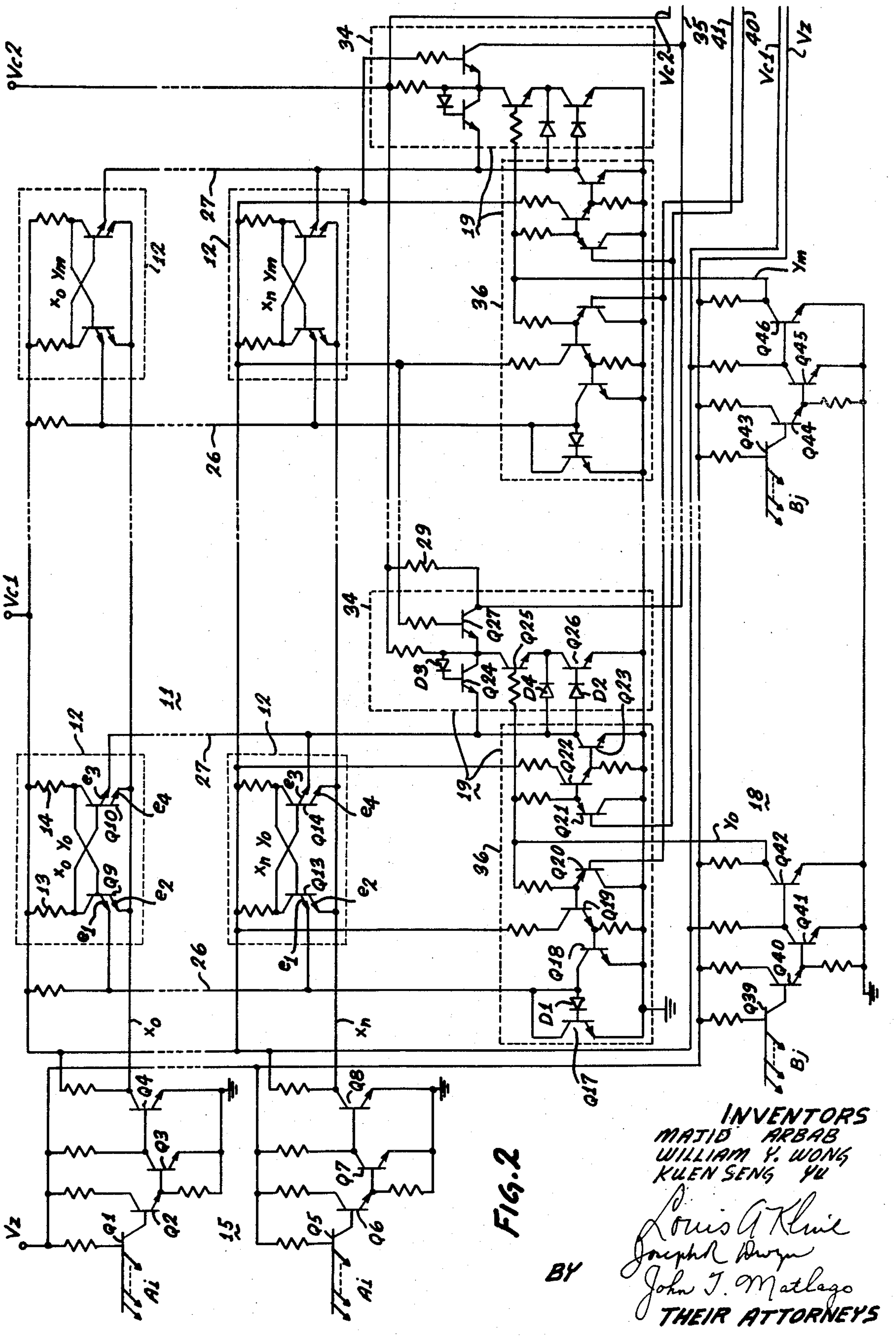
FIG. 2 is a schematic circuit diagram of the memory array shown in FIG. 1 including the common sense preamplifier and write networks provided for each column of the array and the row and column decoders for enabling a selected one of the memory cells of the array to be operative.

Referring to FIGS. 2 and 3, a detailed schematic circuit diagram of the memory array and service circuits that are provided on one of the chips of the memory of the present invention is shown. Each memory cell 12 of the array 11 is comprised of a pair of double-emitter NPN bipolar transistors such as transistors Q9 and Q10 shown cross-coupled with the base of each connected to the collector of the other and with the collectors of each connected through load resistors 13 and 14, respectively, to a source of positive potential Vc1. It is thus seen that the pair of transistors in each memory cell 12 forms a flipflop circuit wherein one transistor of the pair is always conducting or on and the other transistor of the pair is always nonconducting or off. In the present invention, for purposes of explanation, when the transistor Q10 is conducting a binary digit "1" is assumed to be stored in the flipflop and when the transistor Q9 is conducting a binary digit "0" is assumed to be stored in the flipflop. During the idling operation of the memory array, the pair of transistors of each of the memory cells 12 in each column thus conducts, depending upon whether a binary digit "1" or "0" is being stored in the cells, through either one or the other of the common lines 26 and 27 associated with each column. For example, in column $y_0$, if the transistors on the left of each of the memory cells shown, such as transistor Q9 in row $x_o$ and transistor Q13 in row $x_n$, are storing a binary digit "0, " they conduct through their respective emitters $e_1$ to common line 26 and through transistor Q17 to ground, while if the transistors on the right of each of the memory cells in column $y_0$, such as transistor Q10 in row $x_o$ and transistor Q14 in row $x_n$, are storing a binary digit "1" they conduct through their respective emitters $e_3$ to common line 27 through transistor Q26 to ground. This mode of operation corresponds to the low power dissipation level condition of the memory circuit provided on the chip. During the idling operation the control transistors of the respective row decoders 15, such as transistors Q4 and Q8 shown, whose collectors are connected via row lines $x_o$ and $x_n$ to the emitters $e_2$ and $e_4$ of the respective transistors of each memory cell in the row, are all in a nonconducting condition. Thus during idling the emitters $e_2$ and $e_4$ of the respective transistors of the memory cells are held at a relatively high potential while either the emitter $e_1$ or $e_3$ of the respective transistors of the memory cells is able to operate at a lower potential level, thus assuring that during the idling operating condition all the current conducts from Vc1 through the collector of either the left or right transistor of a memory cell and through the emitters $e_1$ or $e_3$ to the common line 26 or 27 and through transistors Q17 or Q26 to ground. During the idling operation the service circuits are not operating since chip enable pulse Vz is not applied. In order to select a particular memory cell 12, the appropriate ones of the row decoders 15 and column decoders 18 must be selected by supplying address data to the A register 31 and B register 32 which provide signals Ai and Bj. The row decoder 15 for the first row line $x_o$ is shown by circuitry represented by transistors Q1, Q2, Q3, and Q4. The column decoder for the first column line $y_o$ is shown by circuitry represented by transistors Q39, Q40, Q41, and Q42. Transistor Q1 has a plurality of emitters connected to a unique set of row address signals Ai provided by the A register 31 while transistor Q39 has a plurality of emitters connected to a unique set of column address signals Bj provided by the B register 32. In order for these particular row and column decoders to be operable to select the memory cell designated $x_0y_0$, all the emitter voltages of transistor Q1 and Q39 must be at a high level. In this event, in response to chip enable pulse Vz, the base-emitter junctions of transistor Q1 and Q39 will be reverse biased thereby turning on transistors Q2 and Q40, respectively, which in turn respectively saturate transistors Q3 and Q41 which respectively keep transistors Q4 and Q42 cutoff, thereby selecting the particular $x_o$ row line and $y_o$ column lines associated with these particular row and column decoders, i.e., the current from the memory cell in the selected row $x_o$ only continues to flow into the common lines 26 and 27 provided for the respective columns and then into the sense preamplifier and write network 19 provided for each of the columns. However, only the one network 19 provided for the first column $y_o$ is active inasmuch as it is connected to the column decoder 18 that has been selected to be operable by the B register. Note that all the other row and column decoders will not be operable to select row and column lines since their emitter voltages as provided by the A and B registers are not all at a high potential level. The row decoder 15 for row line $x_n$ is shown by circuitry represented by Q5, Q6, Q7 and Q8 while the column decoder 18 for column line $y_m$ is shown by circuitry represented by Q43, Q44, Q45 and Q46. Accordingly, in this event, in response to chip enable pulse Vz, transistor Q5 and Q43 will be saturated thereby respectively turning off transistors Q6 and Q7 and Q44 and Q45 which in turn cause transistors Q8 and Q46 to be saturated thereby placing the select lines $x_n$ and $y_m$ associated with the row decoders and the column decoders at a low potential level. Similarly, all the other row and column select lines, except the pair needed to select the addressed cell, are placed at low potential levels. As a result of this operation for the row decoders 15, current will be diverted from the common lines 26 and 27 for all the rows except the selected row and as a result of this operation for the column decoders 18 the sense preamplifier and write network 29 for the selected column only will be made operative while these circuits for all the other columns will be maintained inoperative.

Having described how a particular memory cell 12 of the memory array 11 is selected, the operation of either sensing the data stored in the selected cell of the array 11 or of writing input data into the selected cell of the array 11 will next be described.

In order to consider how the contents of the memory cell is sensed, the operation of the sense preamplifier portion 34 of network 19 during the idling operation of the memory array will first be considered. Assuming that transistor Q10 of memory cell $x_0y_o$ is conducting, it should be noted that current from source Vc1 is conducting through common line 27, through diode D2 and through the base-emitter junction of transistor Q26 to ground. Also a diode D4 is provided between line 27 and the collector of transistor Q26. Under these conditions transistor Q26 is barely saturated but actually not turned on in the sense that collector current will flow. At this time a small amount of current conducts from source Vc2, passes through diode D3, the base-emitter junction of transistor Q24, diode D2 and the base-emitter junction of transistor Q26 to ground. At this time current from source Vc2 cannot conduct through the path comprising resistor 29 and transistors Q27, Q25 and Q26 to ground, since transistor Q25 is not turned on. Thus during the idling operation of the memory array 11 the transistor Q27 is cut off. The resulting relatively high voltage level of the collector of transistor Q27 as sensed on line 35 is connected to the base of transistor Q54 of sense output summer 23 (FIG. 3), causing transistor Q54 to be saturated. At this point it should be noted that the saturation of transistor Q54 would normally saturate transistors Q53 and thus control the potential on the summer output 39 connected to the collector of transistor Q55. However, the chip enable voltage pulse Vz is not applied at this time and transistor Q53 is not operable. Accordingly, transistor Q55 is at cutoff and the voltage at the summer output 39 is at a high level during the idling operation of the memory array.

When it is desired to nondestructively read or sense the contents of a selected memory cell the memory cell $x_0y_o$ has been selected as previously discussed and transistor Q10 of cell $x_0y_o$ is assumed to be conducting indicative of the cell storing a binary "1" digit. It is now assumed that the R/W control signal is at a low potential indicating that a read cycle (FIG. 5) is to be performed. In response to the chip enable pulse Vz, the input transistor Q50 of the read-write control circuit 21 is turned on and transistor Q51 is turned off. Thus transistor Q52 is turned off rendering the sense output summer 23 operable and transistor Q49 is turned off rendering the input data circuit 25 inoperable. Further in response to chip enable pulse Vz, the high potential on column line $y_o$ from the column address decoder is connected to saturate transistor Q25 of the same preamplifier portion 34 of network 19 associated with the column $y_o$ memory cells of the array. In this particular case, since transistor Q26 of the sense preamplifier 34 is in an enabled condition due to the conduction of transistor Q10 through emitter $e_3$ and transistor Q25 is on due to the high voltage on column line $y_o$ it can be seen that the potential level at the collector of transistor 27 is switched from the higher level it previously resided in to a relatively lower level, i.e., it now resides at a voltage level closer to ground as a result of the current from source Vc2 conducting through resistor 29 and transistors Q27, Q25 and Q26 to ground. The lower potential on the collector of Q27 is connected by line 35 to sense output summer 23 circuit shown in FIG. 3. This causes transistor Q54 of sense output summer circuit 23 to be cut off which in turn causes transistor Q53 to be cut off (since the transistor Q53 is now operating due to the presence of the Vz chip enable pulse) which in turn causes transistor Q55 to be saturated thereby placing the output voltage on output line 39 of the summer circuit 23 at a low level and indicating that the selected memory cell 12 is in a state wherein transistor Q10 of selected memory cell $x_0y_o$ is conducting, i.e., a state in which the selected cell is storing a binary digit "1." Note that if transistor Q10 of selected memory cell $x_0y_o$ is assumed to be off, i.e., the cell is storing a binary digit "0," the collector-emitter path of transistor Q26 is non-conducting and it can be seen that the voltage at the collector of transistor Q27 remains at a relatively high level relative to ground. This causes transistor Q54 to be saturated which in turn causes transistor Q55 to be cutoff thereby placing the output voltage on summer output line 39 at a high level indicating that the selected memory cell $x_0y_o$ is in a state wherein Q10 is non-conducting, i.e., a state in which the selected memory cell is storing a binary "0" digit.

The operation of the memory circuit of FIGS. 2 and 3 during the write cycle will next be described by reference to the waveforms shown in FIG. 4. During the write cycle the row address decoders 15 operate as previously described in response to the Vz chip enable pulse to select row line $x_o$ thereby placing it at a high potential level to the exclusion of all the other row lines, and the column decoder 18 operates to select column line $y_o$ thereby placing it at a high potential level to the exclusion of all the other column lines. Assume that a binary digit "0" as received on the "0" input to data input circuit 25 and connected by line 40 to the write portions 36 of the memory array is to be stored in memory cell $x_0y_o$, i.e., the left transistor Q9 of cell $x_0y_o$ is to be made conductive. Prior to the application of the Vz pulse, a high potential level R/W control signal must be applied to the read-write control circuit 21. This turns transistor Q50 off which causes transistor Q51 to be turned on which causes transistor Q52 to be turned on which causes output transistor Q55 to be turned off thereby placing the summer output line 39 at the normal high potential level and assuring that the sense output summer 23 is not operable during the writing cycle of the memory. Simultaneously with transistor Q52 being turned on transistor Q49 of the data input circuit 25 is turned on which cuts off transistors Q47 and Q48 which normally operate to prevent input data signals "1" – "0" from being received by the memory. In this instance since a binary "0" digit is to be written into the memory cell the "0" input to data input circuit 25 must receive a high potential waveform. This turns transistor Q20 off in the write circuit portion 36 of the network 19 associated with column $y_o$ and with the concurrence of a $y_o$ column selecting signal from column decoders 18 (in response to chip enable pulse Vz) transistor Q19 turns on, resulting in transistor Q18 turning on. This places the appropriate emitter $e_1$ of transistor Q9 at a low potential relative to the emitter $e_3$ of transistor Q10 in the selected memory cell $x_0y_o$ thereby causing current flow to occur through transistor Q9 and thereby turning on transistor Q9 and turning off transistor Q10, thereby writing a binary digit "0" into the selected memory cell $x_0y_0$. When a binary digit "1" is to be written into a selected cell, the "1" input is provided with a signal and connected by line 41 to the write portions 36 of the array. Assuming the selected memory cell is in the first column $y_0$, the Q21 transistor is turned off and with the concurrence of a $y_o$ column selecting signal, transistor Q22 turns on resulting in transistor Q23 turning on. This places the appropriate emitter $e_3$ of the right transistor of the selected memory cell at a relatively lower potential thereby writing a binary digit "1" in the selected memory cell.

It should be noted that various modifications can be made to the present invention. For example, it should be noted that when one of the row decoders 15 selects a particular row line to the exclusion of all the other row lines, all the memory cells in the selected row are being simultaneously connected to the sense preamplifier and write networks 19 associated with their particular columns, i.e., they are operating in parallel. Thus this circuit arrangement could be used to provide a single word of information on each row of the memory array which could be accessed in parallel by the selection of a row in the array. In such an arrangement a sense output circuit would be connected to each of the sense preamplifier portions 34 of networks 29 provided for each of the columns, and a data input circuit 25 would be provided for each column and connected to each of the write portions 36 of the networks 29 of each column. Note that in such an arrangement of a parallel storage and readout for the memory it would not be necessary to provide a column decoder 18. Still further it should be noted that in another modification of the memory circuit the data stored, for example, in half the memory cells in a row of the array could be arranged to represent the digits of a first word and the other half of the memory cells in the row could represent the digits of a second word such that when a row is selected by the row decoders 15 to the exclusion of all other rows only the column networks 29 corresponding to the word selected would be sensed at the output of the memory array or be rendered operable to receive data input to be written into the memory cells corresponding to the word selected.

It should thus be clear that the present circuit arrangement provides a very flexible circuit arrangement which can be modified to provide various types of memory circuit arrangements without departing from the principle involved or sacrificing any of its advantages. The present invention therefore is not to be considered as limited to the specific disclosure provided herein, but is to be considered as including all modifications or variations coming within the scope of the invention as defined in the appended claims.

What is claimed is:

1. An integrated circuit corresponding to a digit plane of a computer memory for fabrication in accordance with large scale integration technology on a chip including a source of standby energy, an array of memory cells arranged in rows and columns, each of the memory cells having a pair of bipolar transistors in flipflop arrangement coupled to said cource of standby energy, a pair of common lines provided for the memory cells of each column of the array, each of the memory cells in a column having one or the other of the bipolar transistors thereof conducting during idling operation of the memory circuit through either one or the other of the common lines depending upon whether a binary "1" or "0" digit is being stored in the memory cell, said idling operation corresponding to a low power dissipation level of the memory circuit on the chip, a column network coupled to the pair of common lines provided for the memory cells of each column of the array, row selecting means effective upon being energized to divert current from all the memory cells in the array away from the common lines of the respective columns except the current from the cells in a selected row, column selecting means effective upon being energized to enable the column network of a selected column of the array to be operable, sensing means effective upon being energized to respond to the current in the column network of the selected column of the array to thereby sense the digit stored in a selected cell of the array, and a source of pulse energy, said pulse energy operating to simultaneously momentarily energize said row selecting means, said column selecting means, and said sensing means to enable said sensing means to sense whether a binary "1" or "0" digit is stored in a selected cell of the memory array, said momentary energizing of said row and column selecting means and said sensing means corresponding to a high power dissipation level of the memory circuit on the chip.

2. The invention in accordance with claim 1 wherein each of the bipolar transistors in a memory cell has a first and second emitter, wherein the first emitter of each bipolar transistor whose conduction corresponds to storage of a binary "1" digit is coupled to one line of the pair of common lines and the first emitter of each bipolar transistor whose conduction corresponds to storage of a binary "0" digit is coupled to the other line of the pair of common lines associated with each column, wherein a common row line is provided for the memory cells of each row of the array, each said row lines coupled to the row selecting means, and wherein the second emitters of each of the bipolar transistors in the cells of a row are coupled to the common row line provided for that row of the array.

3. The invention as defined in claim 1 wherein each of said column networks includes a sense preamplifier circuit and a write circuit, wherein a data input circuit is coupled to each of the write circuits of the column networks, wherein a sense output summer circuit is coupled to each of the sense preamplifier circuits of the column networks, wherein a read-write control circuit is provided for enabling either said data input circuit or said sense output summer circuit to be operable, said read-write control circuit being energized to momentarily operate in response to said source of pulse energy, and wherein the column network associated with the selected column operates depending upon which of the circuits is rendered operable by the read-write control circuit to either sense data being stored in the selected cell of the array or write data into the selected cell of the array.

* * * * *